Patented Dec. 5, 1922.

1,437,674

UNITED STATES PATENT OFFICE.

SAMUEL PALKIN, OF STAMFORD, CONNECTICUT, DEDICATED, BY MESNE ASSIGNMENTS, TO THE PEOPLE OF THE UNITED STATES.

PROCESS OF MAKING PHOTOGRAPHIC SENSITIZING DYES OF THE DICYANINE TYPE.

No Drawing.   Application filed March 17, 1922. Serial No. 544,638.

(FILED UNDER THE ACT OF MARCH 3, 1883, 22 STAT. L., 625.)

*To all whom it may concern:*

Be it known that I, SAMUEL PALKIN, a citizen of the United States, and an employee of the Department of Agriculture of the United States of America, residing in the city of Stamford, county of Fairfield, State of Connecticut, whose post-office address is care of Department of Agriculture, Washington, D. C., have invented certain new and useful Improvements in the Processes of Making Photographic Sensitizing Dyes of the Dicyanine Type, of which the following is a specification.

This application is made under the Act of March 3, 1883, chapter 143 (22 Stat., 625) and the invention herein described and claimed may be used by the Government of the United States or any of its officers or employees in the prosecution of work for the Government, or any person in the United States, without payment to me of any royalty thereon.

These dyes have been produced hitherto by the action of sodium ethylate in alcoholic solution upon the quaternary halids of methylated quinoline bases.

By $\alpha$, $\gamma$ methylated quinoline bases are meant such derivatives of quinoline and related bases as have one methyl group adjacent to the nitrogen of the heterocyclic ring and another methyl group diametrically opposite the nitrogen in the heterocyclic ring.

I have found that these dyes can be obtained directly in a state of sufficient purity by the action of sodium sulphide, or sodium sulphide and chloroform in alcoholic solution upon the hereinbefore mentioned quaternary halids or other addition products. While the use of alcohol is not indispensable, I have obtained better results in ethyl alcohol than in any other solvent.

The following examples will serve to illustrate the prefered procedure. The invention, however, is not confined to these examples. The parts are by weight:

*Example I.*

An alcoholic solution of sodium sulphide is prepared by boiling 25 parts of sodium sulphide $Na_2S.9H_2O$ in 100 parts of 95% alcohol for about 3 minutes, cooling somewhat and decanting or filtering the alcoholic solution of sodium sulphide. Four parts of 2.4 dimethyl 6 ethoxy quinoline ethiodide are dissolved in 100 parts of a hot (50° C.) alcoholic solution of sodium sulphide, 9.5 parts of chloroform added nnd the whole kept in a water bath at 50° C. for 2 hours, preferably with stirring, or, allowed to stand at room temperature for 24 hours. The reaction mixture, which is colored dark blue, is then cooled and filtered by suction, washed several times with a total of 20 parts of alcohol, then with ether (20 parts) and finally with 50 parts of water to remove all sulphides. The water wet crystals are then washed with alcohol and ethyl ether, and dried. The green crystals of dicyanine are kept in a cool, dry place, well protected from light.

*Example II.*

An alcoholic solution of 2.4 dimethyl 6 ethoxy quinoline ethnitrate is prepared in the following manner: 5.5 parts of 2.4 dimethyl 6 ethoxy quinoline ethiodide are dissolved in 25 parts ethyl alcohol (95%) and slowly poured into a hot solution of alcoholic silver nitrate prepared by dissolving 2.5 parts pure silver nitrate in 150 parts boiling 95% alcohol. The silver iodide is allowed to settle, and removed by filtration. If, when the filtrate containing the ethnitrate in solution is further tested with alcoholic ethiodide and shows a precipitate, enough ethiodide is added until the clear filtrate shows no further precipitate on addition of alcoholic ethiodide. The alcoholic ethnitrate is then concentrated on the water bath to 50 parts and treated with 75 parts of alcoholic sodium sulphide (prepared as described under Example I) and 10 parts of chloroform and the solution warmed for 3 hours at 50° C. The reaction mixture is cooled, filtered by suction, washed with 50 parts of alcohol, then with 50 parts ethyl ether. The dried precipitate is washed with 100 parts of water, filtered, the water wet crystals washed succesively with 50 parts of alcohol and 50 parts of ethyl ether.

*Example III.*

Five parts of 2.4.6 trimethyl quinoline ethiodide, are dissolved in 125 parts of a hot alcoholic solution of sodium sulphide prepared as described under Example I, 9.5 parts of chloroform added and treated in the same manner as described under Example I.

Having now fully described my invention, what I claim and desire to protect by Letters Patent is—

1. The process of producing photographic sensitizing dyes of the dicyanine type by the interaction of sodium sulphide in alcoholic solution with quaternary halid addition products of the $a, \gamma$ dimethylated quinoline derivatives.

2. The process of producing photographic sensitizing dyes of the dicyanine type by the interaction of sodium sulphide and chloroform in alcoholic solution with quaternary halid addition products of the $a, \gamma$ dimethylated quinoline derivatives.

3. The process of producing photographic sensitizing dyes of the dicyanine type by the interaction of sodium sulphide in alcoholic solution with quaternary addition products of $a, \gamma$ dimethylated quinoline derivatives.

4. The process of producing photographic sensitizing dyes of the dicyanine type by the interaction of sodium sulphide and chloroform in alcoholic solution with addition products of $a, \gamma$ dimethylated quinoline derivatives.

In testimony whereof I affix my signature in the presence of two subscribing witnesses.

SAMUEL PALKIN.

Witnesses:
H. WALES, Jr.,
H. L. J. HALLER.